Figure 1:
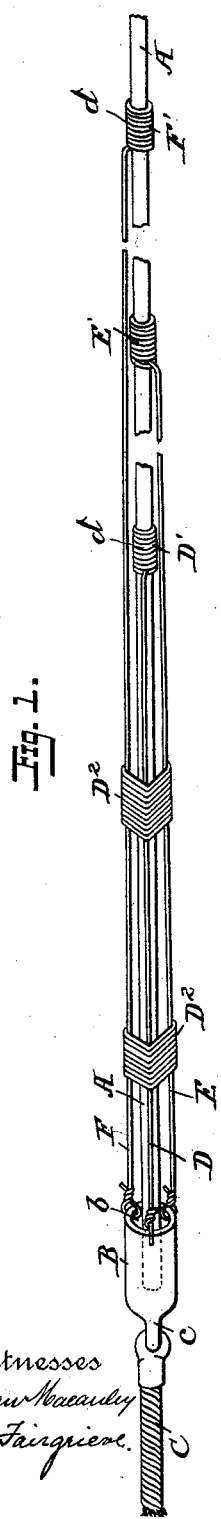

(No Model.)

T. F. O'CONNOR & J. W. MARSH.
MEANS FOR DRAWING CABLES INTO CONDUITS.

No. 482,270. Patented Sept. 6, 1892.

Witnesses
Abram Macauley
J. A. Fairgrieve

Inventors
Thos. F. O'Connor
and
Joseph W. Marsh
By Foster Freeman
Attorneys

UNITED STATES PATENT OFFICE.

THOMAS F. O'CONNOR, OF NEW YORK, N. Y., AND JOSEPH W. MARSH, OF PITTSBURG, PENNSYLVANIA, ASSIGNORS TO THE STANDARD UNDERGROUND CABLE COMPANY, OF PITTSBURG, PENNSYLVANIA.

MEANS FOR DRAWING CABLES INTO CONDUITS.

SPECIFICATION forming part of Letters Patent No. 482,270, dated September 6, 1892.

Application filed January 8, 1892. Serial No. 417,394. (No model.)

*To all whom it may concern:*

Be it known that we, THOMAS F. O'CONNOR, residing in the city, county, and State of New York, and JOSEPH W. MARSH, residing in Pittsburg, in the county of Alleghany and State of Pennsylvania, citizens of the United States, have invented certain new and useful Improvements in Means for Drawing Cables into Conduits, of which the following is a specification.

Our invention relates to means for drawing cables into conduits, and more especially to means whereby long lengths of cables may be readily drawn into any subway conduits or ducts in a manner to prevent injuring the cable, and thus provide that the sections of conduits or ducts can be of comparatively great length and the manholes correspondingly far apart; and our invention consists in the means substantially such as are hereinafter indicated.

In the growing use of subways or conduits, especially for electric conductors, such as for electric light, telegraph, telephone, or other purposes, it has been found exceedingly difficult to supply the ducts or conduits with cables after the conduits are once laid, and it has been found necessary to lay the conduits or ducts in comparatively short sections having frequent manholes, so that the cables, especially when they are of considerable size and carry a number of insulated conductors, can be properly and readily introduced into the conduit without danger of injury to the insulation of the cable or otherwise straining or breaking. The construction of these manholes not only entails a considerable addition to the initial expense of a conduit system, but it further entails an expense in the cost of joining or splicing the cables, and not only is there added expense, but it is exceedingly difficult to produce a joint in a cable having a considerable number of wires in which the insulation of the joint is maintained as high as the remaining portion of the cable, so that it is not only an expense, but an actual detriment to a theoretically-perfect cable to have numerous joints therein.

It is primarily with the object of avoiding these difficultes and objections that our invention is made, and it is especially adapted to drawing in cables of considerable size and relatively great lengths without injury, but it is equally applicable to use in connection with small and light cables, regardless of their length, as it renders it unnecessary to make the cable of such great strength as is now ordinarily required and avoids the danger of straining or breaking the cable or injuring its insulating properties.

In order that our invention may be more readily understood, reference is made to the accompanying drawings, in which—

Figure 2:
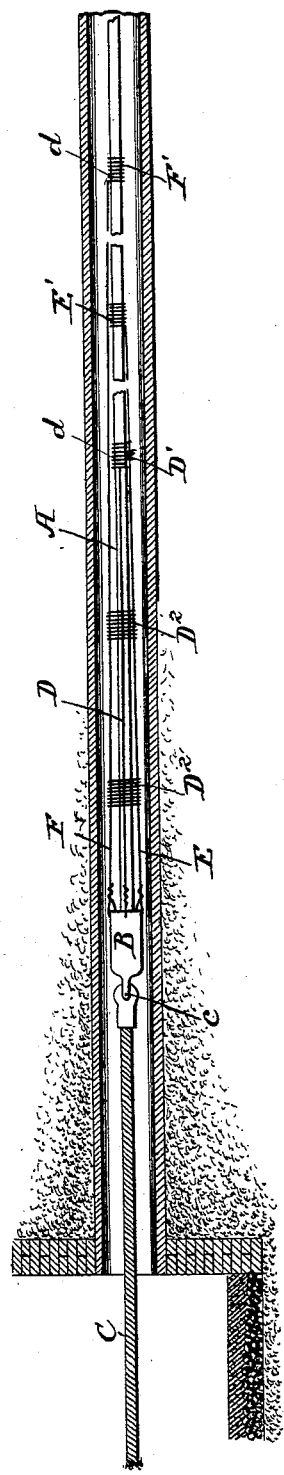

Figure 1 is a plan view representing a cable arranged in accordance with our invention and in condition to be placed in a conduit, while Fig. 2 is a sectional view showing a conduit connecting two manholes with the cable being drawn into the conduit.

Heretofore in practice it has been common to connect to the end of the cable some sort of a device—such as a rope, rod, or other means—which is passed through the conduit and which is drawn by hand or by mechanical means into the manhole-space or perhaps outside thereof, and in this way the cable is drawn into the duct or conduit. It is evident that this mode of operation brings all the strain necessary to introduce the cable into the conduit upon the cable itself, and more especially upon the end thereof to which the chain or rope or other device is attached.

It has been found that in small and light cables the strain is often so great as to break the cable completely, and when not sufficient for this it impairs the insulation to a greater or less extent. In cables of large size these liabilities are still present, and especially when the cable consists of a considerable number of wires insulated from each other and from the inclosing armor or casing, which is usually of lead, and there is liability of producing cracks, openings, or ruptures in some portion of the lead cover, which allow air or moisture to penetrate the cable and impair its insulation. Furthermore, it has been common to punch holes in the armor of the cable near the end to provide means for fastening the rod or other devices by which it is drawn into the duct, and these damaged ends usually have to be removed to render the cable perfect. In order to avoid these objections, we provide one or more sufficiently-strong wires of iron or steel or similar material, which is not liable to stretch, and attach this wire or wires to the cable at different points throughout its length, so as to distribute the strain or pull on the cable and not confine it to the end.

Thus, referring to the drawings, A represents a cable, which may be of any size or length, and B represents a cap having a hollow end $b$, into which the forward end of the cable is projected. This cap is preferably provided with an eye $c$, to which is connected a rope, wire, or other similar device C, by means of which the cable is drawn into the duct.

Connected to the cap B are one or more wires, rods, ropes, or other inelastic strips D, and these wires are secured to the cable in a manner to take the strain off the cable so far as practicable, so as to prevent injury thereto. Thus the wire or wires may be securely bound to the cable by metal ribbon or tough cord or tape $d$, which may be saturated with preservatives or insulating compound in order to produce firmer adhesion. In the case of short cables where only one wire is used the end of the wire—as at D', for instance—is secured to the cable, while the intermediate bindings or wrappings, as $D^2$, are made loose—that is, the wire may be a little shorter than the length of the cable between its forward end and the place of attachment of the wire, the bindings simply serving to keep the two together, so that the bulk of the strain upon the wire will be at the point of attachment, which may be intermediate the ends. It is preferable, however, especially in long cables or in cables of comparatively small size and light construction, to provide several of these wires, as D, E, and F, and to attach them all to the cap or other device at the end of the cable, and, further, attach their ends securely to the cable at different distances from the forward end, they preferably being bound by loose wrappings $D^2$ at intermediate points, as before suggested. Thus in the drawings we have shown the wire or equivalent D attached to the cable at a point D', while the wire E is attached at E' and F at a point F'. For instance, in a cable, say, two thousand feet long the first wire might be about a third of the distance and attached to the cable, say, at a point six hundred and sixty feet, or thereabout, from its end. The second wire would be attached at a similar distance from the first wire and the third wire might be attached near the rear portion of the cable, and being wound with loose wrappings or bindings at intermediate points and preferably being somewhat shorter than the various lengths of the cable, the strain resulting from pulling the wire and cable into the conduit or duct would be borne almost entirely by the wires, and the wires would distribute the strain in the best possible manner. Of course it will be obvious that more or less drawing-in wires would be used and be attached to the cable at different points, according to the exigencies of any particular case and the general advantageous results of our invention attained. Furthermore, the end of the cable being inserted into the recess of the cap there will be no "snagging" or interference with any slight obstruction in the ducts or in the joints thereof. It will be evident that these drawing-in wires may be attached to the cable in the process of construction or before shipment from the factory, or they may be attached when the process of drawing into the ducts is to begin. Being firmly attached to the cable they remain in the duct with the cable for the purpose of withdrawing the cable if, perchance, that is necessary. All these minor features and applications of our invention will readily suggest themselves to those skilled in the art, and we do not, of course, limit our invention to these features.

It will be evident from the above description that by the use of our invention cables of different sizes and of great lengths can readily be introduced into the ducts or conduits with the least danger or injury in any respect, and that the means by which this is done are exceedingly simple, cheap, and readily applied, and a great saving can be made not only in preserving the integrity of the cables themselves, but in avoiding the building of manholes at short distances apart, as is necessary under the present arrangements.

What we claim is—

1. The means, substantially as hereinbefore set forth, for introducing cables into conduits or ducts, which consists, essentially, of a draw-rope provided with a cap for the reception of the end of the cable and having connected thereto a series of wires the ends of which are secured to the cable, as and for the purposes set forth.

2. As a means for introducing cables into conduits or ducts and preventing undue strain thereof, the combination of a series of draw-wires connected to the cable at different points along its length, substantially as described.

3. As a means for introducing cables into conduits or ducts, the combination of a draw-rope having a cap for the reception of the free end of the cable and a series of wires, connected to the cap and to the cable at different points along its length, substantially as described.

4. As a means for introducing cables into conduits or ducts, the combination of a series of draw-wires connected to the cable at different points, each draw-wire being slightly shorter than the section of the cable to which it is attached, substantially as described.

5. As a means for introducing cables into conduits or ducts, the combination of a draw-rope having a cap provided with a recess for the reception of the free end of the cable, and a series of draw-wires attached to the cap and having their free ends securely attached to the cable at different points and intermediate loose wrappings for the cable and draw-wires, substantially as described.

In testimony whereof we have signed our names to this specification in the presence of the subscribing witnesses.

THOMAS F. O'CONNOR.
JOSEPH W. MARSH.

Witnesses to signature of Thomas F. O'Connor:
GEORGE L. WILEY,
D. P. REGAN.

Witnesses to signature of Joseph W. Marsh:
F. L. FREEMAN,
W. C. DUVALL.